United States Patent [19]

O'Brien

[11] Patent Number: 4,991,036
[45] Date of Patent: Feb. 5, 1991

[54] MOVING DATA STORAGE MEDIA MODE/DIRECTION CHANGE OPTIMIZATION

[75] Inventor: John T. O'Brien, Lafayette, Colo.

[73] Assignee: Storage Technology Corporation, Louisville, Colo.

[21] Appl. No.: 556,765

[22] Filed: Jul. 23, 1990

Related U.S. Application Data

[63] Continuation of Ser. No. 204,080, Jun. 8, 1988, abandoned.

[51] Int. Cl.$^5$ .................... G11B 15/44; G11B 15/18
[52] U.S. Cl. ................................. 360/71; 360/72.1; 360/74.1
[58] Field of Search ............. 360/71, 72.1–72.3, 360/73.01, 73.04, 73.06, 73.14, 74.1

[56] References Cited

U.S. PATENT DOCUMENTS

| | | | |
|---|---|---|---|
| 4,302,784 | 11/1981 | Mussatt | 360/71 |
| 4,680,650 | 7/1987 | Miyazaki et al. | 360/74.1 |
| 4,802,038 | 1/1989 | Oguro | 360/71 |
| 4,821,129 | 4/1989 | Culp | 360/74.1 |

FOREIGN PATENT DOCUMENTS

| | | | |
|---|---|---|---|
| 0099904 | 5/1986 | Japan | 360/71 |
| 0247970 | 10/1988 | Japan | 360/71 |

Primary Examiner—David J. Severin
Attorney, Agent, or Firm—Dorr, Carson, Sloan & Peterson

[57] ABSTRACT

The moving data storage media mode/direction change optimization apparatus makes use of information received concerning the mode and direction of the next operation to be performed by the data storage system to efficiently reposition the media in a single repositioning operation. In the case where the data storage media is a magnetic tape, the tape control unit receives information concerning the mode and direction of the next operation to be performed prior to the completion of the tape transport automatic repositioning cycle. The tape control unit signals the tape transport to abort the standard repositioning operation and instead to initiate a new repositioning operation which repositions the magnetic tape based on the mode and direction of both the presently executing operation and the next operation. This use of a single repositioning operation, taking into account the mode and direction of the timewise subsequent operation, significantly reduces the amount of time required to reposition the magnetic tape to a point appropriate for the next operation.

28 Claims, 9 Drawing Sheets

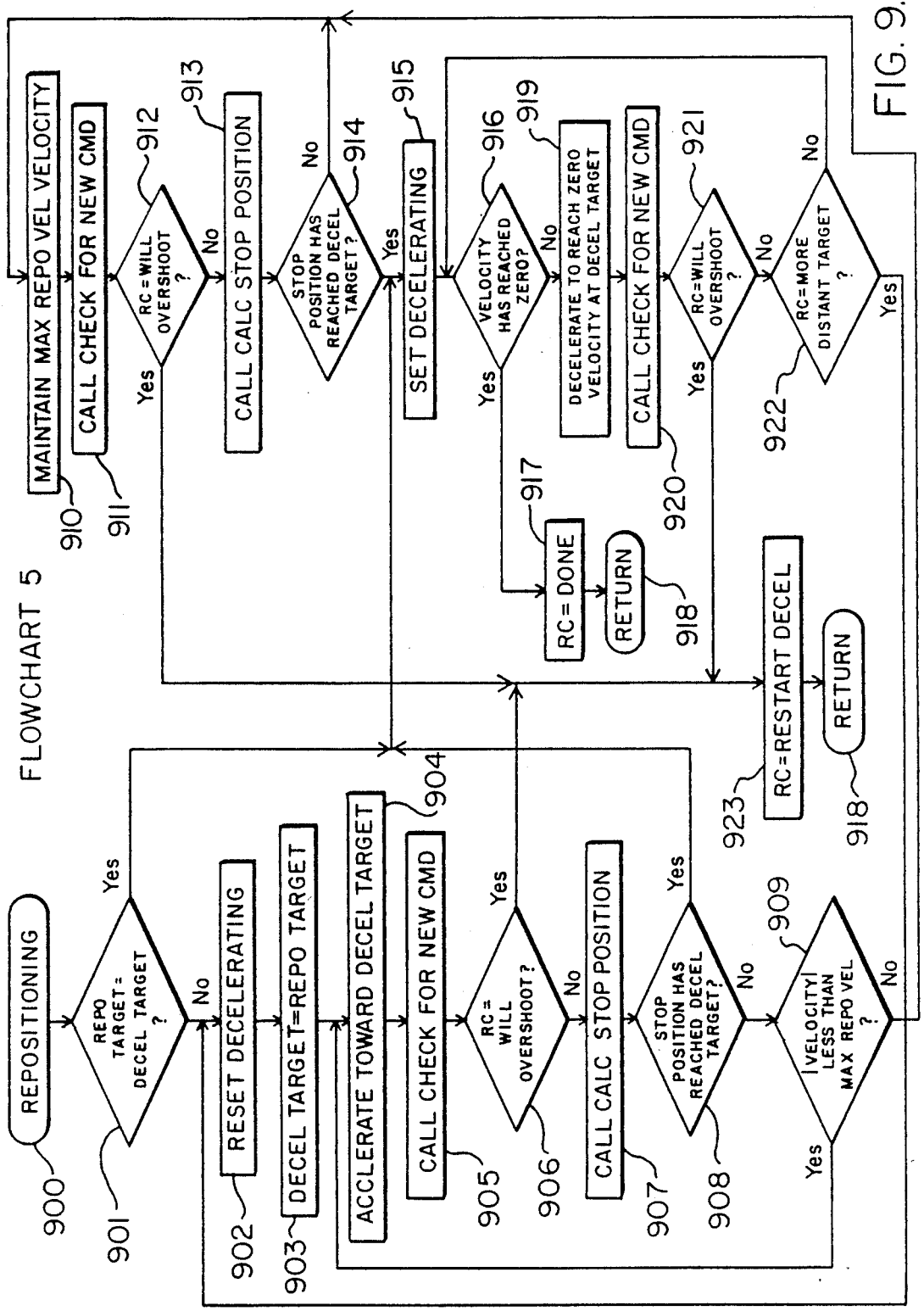

MOVING DATA STORAGE MEDIA MODE/DIRECTION CHANGE OPTIMIZATION

This is a continuation of application Ser. No. 07/204,080, filed June 8, 1988, now abandoned.

FIELD OF THE INVENTION

This invention relates to data storage systems, such as magnetic tape subsystems, and, in particular, to apparatus for optimizing the operation of the tape transport for a change of mode or direction in the reading/writing of data on the magnetic tape.

PROBLEM

It is a problem in the field of data storage systems that use moving data storage media to efficiently manage the motion of the data storage media during a change of mode or direction in the reading or writing of data on the data storage media. Data storage systems that use moving media include the following systems: reel to reel magnetic tape, magnetic tape cartridge, floppy disk, hard disk, and optical disk.

An example of moving media data storage systems is a magnetic tape subsystem that stores data on magnetic tape in groups of data called blocks or records. A block of data is the smallest unit of data that is read or written during one continuous motion of the magnetic tape. Between reading or writing successive blocks of data on the magnetic tape, tape motion may be halted.

Between adjacent blocks of data on the magnetic tape are areas containing no data called Inter-Block Gaps (IBG's). These inter-block gaps are needed to provide space for the motion of the magnetic tape to be halted and then resumed without requiring that the tape transport mechanism be able to resume the motion of the magnetic tape precisely at the point at which the motion of the magnetic tape was previously halted.

Many magnetic tape subsystems operate by decelerating the magnetic tape when the end of a data block is reached, bringing the tape velocity to zero at a point within the IBG. These magnetic tape subsystems then accelerate the tape on a subsequent read/write operation so that the magnetic tape is traveling at a speed appropriate for reading or writing data when the boundary between the end of the inter-block gap and the beginning of the next data block is reached. When operated in this mode, a tape transport must decelerate and accelerate the magnetic tape quickly enough so that the distance traveled during deceleration plus the distance traveled during acceleration is less than or equal to the length of the inter-block gap. Looking at the situation from a different perspective, the length of the inter-block gap must be long enough to provide a sufficient distance for the tape motion to be brought to a halt and then resumed.

It is desirable to make the length of an inter-block gap as short as possible. A shorter inter-block gap allows more data to be placed on a given length of magnetic tape because less of the magnetic tape is used for inter-block gaps. In addition, when multiple data blocks are being read or written without bringing the motion of the magnetic tape to a halt, shorter inter-block gaps lead to a higher average data transfer rate because less time is spent crossing the inter-block gaps which do not contain data.

If the length of an inter-block gap is made shorter than the distance required by a tape transport to decelerate and accelerate the magnetic tape, the tape transport must operate in a different mode than the start-stop mode described above. In a streaming mode, when the end of a data block is reached, the tape transport brings tape motion to a halt at one point on the magnetic tape. The tape transport then moves the magnetic tape in the direction opposite to its previous direction of motion and brings the motion of the magnetic tape to a halt at a second point. This second point is a sufficient distance from the start of the next data block to allow the tape transport to accelerate the magnetic tape to read or write velocity prior to reaching the start of that next data block.

The specific point to which the tape transport repositions the magnetic tape is dependent on what the next operation will be. If separate heads are used for reading and writing data, the tape transport may reposition the magnetic tape to one point if the next operation will be a write and to a different point if the next operation will be a read. If the tape transport supports reading or writing data in both a forward and a backward direction, then the point to which the magnetic tape is repositioned depends on the direction in which the magnetic tape will move during the next read or write operation. There may be other capabilities of the tape transport, such as variable speed operation, which cause differences in the points to which the magnetic tape is repositioned. However, the next tape motion is typically in the same direction and in the same mode (either read mode or write mode) as the previous operation. Tape transports which operate in streaming mode therefore typically automatically reposition the magnetic tape to the point which is appropriate for an operation in the same mode and direction as the previous operation. Essentially, the tape transport assumes that the next operation will be the same as the previous operation.

If mode or direction of the next operation is not the same as the mode or direction of the previous operation, the tape transport must again reposition the magnetic tape from the point to which it had repositioned (having assumed that the next operation would be the same as the previous operation) to the point appropriate for the next operation. This second repositioning operation consumes additional time and reduces the efficiency of the tape subsystem.

SOLUTION

The foregoing problems are solved and a technical advance achieved in the field by the apparatus to optimize the operation of a moving media data storage system during a change of mode or direction in the reading or writing of data on the moving media. This apparatus in the preferred embodiment is part of a magnetic tape subsystem, and when the tape subsystem consists of a separate tape control unit and tape transport, the elements of the apparatus may be embodied in the tape control unit, the tape transport or both.

When the magnetic tape subsystem receives information concerning the mode and direction of the next operation to be performed prior to the completion of the tape transport automatic repositioning cycle and the mode or direction of the next operation is different than the mode or direction of the previous operation, the tape transport mode/direction change optimization apparatus causes the aborting of the standard repositioning operation which positions the magnetic tape based on the mode and direction of the previous operation. The apparatus then initiates a new repositioning operation which is based on both the position and velocity of the tape at the time the new repositioning operation is initiated and the position to which the magnetic tape must be moved in preparation for the next operation. When this new repositioning operation is initiated early in the deceleration and repositioning cycle, a significant reduction is made in the time required to reposition the magnetic tape to the point appropriate for the next operation.

Take for example, the case of a tape transport that accelerates and decelerates the magnetic tape at the same rate. If a forward read operation is completed and the next operation is a backward read of the same data block, the tape transport can avoid all repositioning activity. This is because the point at which the magnetic tape is positioned when the magnetic tape's forward velocity is brought to zero is the very point at which the magnetic tape should be positioned for the following read backward operation. This complete elimination of the time spent repositioning occurs if the tape control unit signals the tape transport of the impending direction change before it completes the initial deceleration of the magnetic tape following the read forward operation. However, even if the tape transport is informed of the direction change after the initiation of the automatic repositioning cycle, the automatic repositioning cycle can be aborted, the tape velocity brought to zero as quickly as possible and a new repositioning motion be initiated more quickly than would have been possible if the first repositioning cycle were to have been allowed to complete.

This example describes a situation in which the maximum possible time savings is obtained by informing the tape transport of an impending mode or direction change and having the tape transport eliminate its repositioning activity based on this information. This example of the need to read a block in one direction and then re-read the same block in the opposite direction arises frequently. When the tape control unit detects an error while reading a block of data, an attempt is made to read the data block in the reverse direction. These data block re-read attempts require the tape transport to cycle between read forward and read backward motions. Shortening or eliminating the repositioning operations significantly reduces the time required to recover from an error or to conclude that the error cannot be recovered from.

Thus, the apparatus to optimize the tape transport operation during a change of mode or direction in the reading or writing of data on a magnetic tape provides a significant savings of magnetic tape repositioning time. This time savings significantly improves the efficiency of the tape subsystem.

BRIEF DESCRIPTION OF THE DRAWING

FIGS. 5 through 9 illustrate in flow diagram form the operation steps taken by the subject apparatus to perform the optimization function.

DETAILED DESCRIPTION

Figure 1:
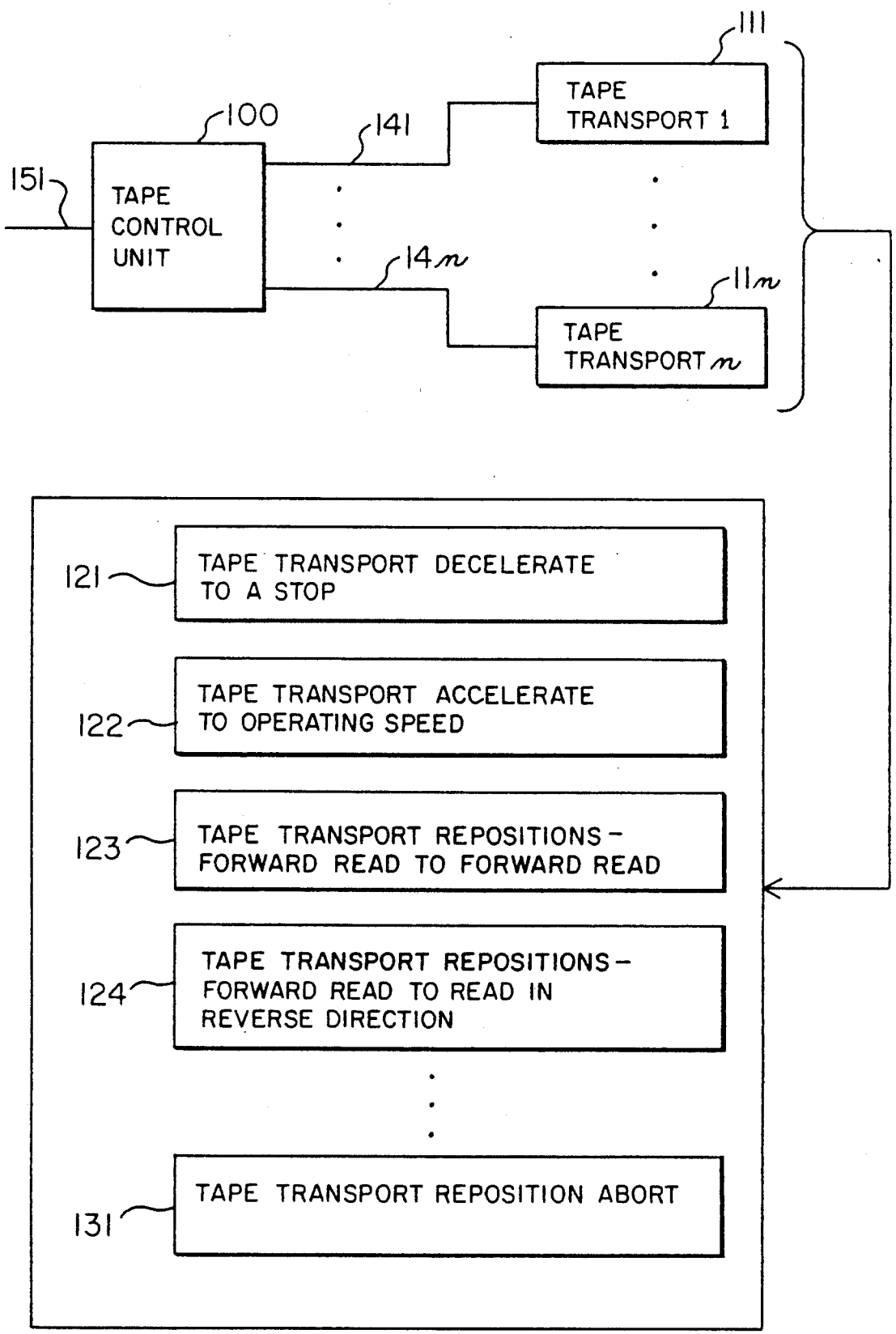
FIG. 1 illustrates in block diagram form the apparatus to optimize the tape transport operation during a change of mode or direction in the reading or writing of data on a magnetic tape.

FIG. 1 illustrates in block diagram form the apparatus to optimize the tape transport operation during a change of mode or direction in the reading or writing of data on a magnetic tape. Element 100 is a tape control unit that contains a plurality of control routines which are used to regulate the operation of a plurality of tape transports 111-11n. Each of tape transports 111-11n contains the mechanism to read/write data on a magnetic tape that is loaded therein. The output of the magnetic tape is transmitted by tape transport 111 over control lead 141 to tape control unit 100 where this data is forwarded over control lead 151 to a computer (not shown).

The division of the functions performed in the tape subsystem is a matter of engineering choice. The above-described tape subsystem architecture is selected for convenience of description only. Many tape subsystems perform all functions in a single unit while other tape subsystems partition the functions between the tape control unit and the tape transport in a manner different from that described above. This division of functions is arbitrary and not essential to the description of this invention.

The plurality of control procedures that are stored in each of tape transports 111-11n are illustrated as a partial list of operations 121-131 in FIG. 1. These operations are implemented as software routines stored in a portion of memory in each tape transport 111-11n. Therefore, each of these routines are stored in a block of memory in tape transport 111 and are illustrated as individual blocks 121-131 in FIG. 1. Examples of these operational procedures are tape transport decelerates magnetic tape to stop (121), tape transport accelerates magnetic tape to operating speed (122), tape transport repositions magnetic tape from forward read to forward read position (123), tape transport repositions magnetic tape from forward read to read in the reverse direction (124) and tape transport aborts repositioning (131). These listed procedures are operations that the plurality of tape transports 111, 11n must perform in reading/writing data on the magnetic tape. A number of these operational procedures are described hereinbelow to illustrate the concepts of the present invention.

DEFINITION OF VARIABLES

DECEL TARGET—Deceleration Target Position: when the magnetic tape is being decelerated, it is decelerated at a rate which causes it to reach zero velocity when it is positioned at the magnetic tape position contained in DECEL TARGET.

DECELERATING—Decelerating Flag: flag which is set when the magnetic tape is being decelerated. This flag being set means that the position stored in DECEL TARGET is the position at which the magnetic tape will stop if deceleration is allowed to continue.

END OF CMD POSITION—End of Command Position: the position of the magnetic tape at the time the most recently executed command completed is stored in this variable.

NEW CMD VALID—New Command Valid Flag: flag which is set when a new command has been received and stored in NEW COMMAND. This flag is reset when the command in NEW COMMAND is copied into OLD COMMAND.

NEW COMMAND—New Command: a new command is stored in this variable from the time that it is received through the time required to do any repositioning in anticipation of the execution of the command. The value in NEW COMMAND is copied into OLD COMMAND at the initiation of command execution.

OLD COMMAND—Old Command: a command is stored in this variable from the time that the execution of the command is initiated until the execution of the next command is initiated.

RC—Return Code: This variable holds the return code value returned by any subroutine.

REPO TARGET—Repositioning Target Position: variable which stores the position at which the magnetic tape must be prior to the initiation of the command stored in NEW COMMAND. This value is always calculated by the CALC REPO TARGET subroutine.

STOP POSITION—Stop Position: position at which the magnetic tape will reach zero velocity if deceleration is initiated immediately or, if the magnetic tape is in the process of being decelerated, if deceleration is allowed to continue. This value is always calculated by the CALC STOP POSITION subroutine.

BASIC SERVO CONTROL LOOP

Figure 5:
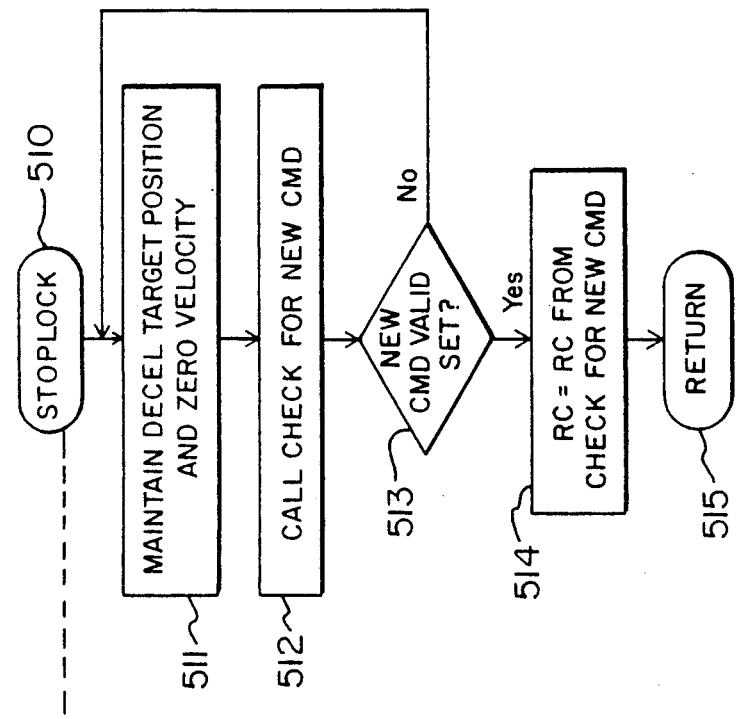
Figure 5:
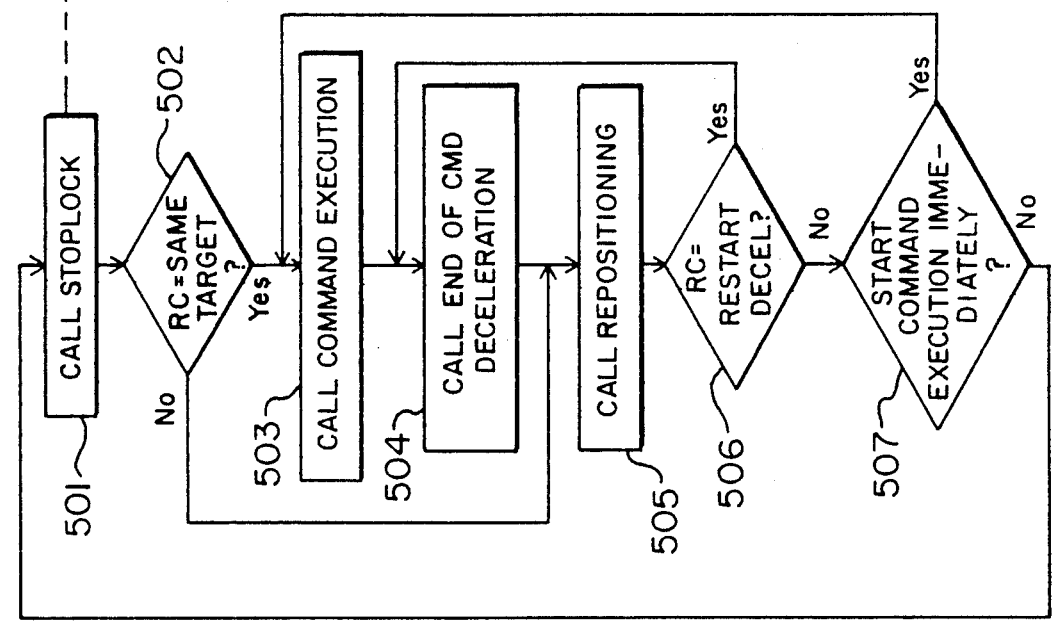

FIG. 5 illustrates the basic servo control loop that is used in the magnetic tape subsystem. When the tape transport (example—111) is sitting idle awaiting a command to start motion, tape transport 111 executes step 501 of the routine illustrated in FIG. 5. This step calls the subroutine STOPLOCK which maintains the position of the magnetic tape on tape transport 111 and monitors signal lead 141 for commands from tape control unit 100.

The STOPLOCK subroutine is entered at step 510 and begins execution at step 511 where the tape transport 111 mechanism is checked to insure that the magnetic tape is maintained at the position defined by DECEL TARGET and at a tape velocity of 0. The details of this process are not pertinent to this invention. Processing then proceeds to step 512 where the buffer connected to signal lead 141 is checked to determine whether a new command (CMD) has been received. This is accomplished by calling the subroutine CHECK FOR NEW CMD illustrated in FIG. 6.

CHECK FOR NEW COMMAND

The CHECK FOR NEW CMD subroutine is entered at step 600 and executes step 601 where a determination is made whether a new command has been received from tape control unit 100. If no command has been received, processing advances to step 611 where the return code (RC) is set to SAME TARGET to indicate that no new command has been received. If a new command is received, it is stored in the variable NEW COMMAND at step 602 and the flag NEW CMD VALID is set at step 603. At step 604, the received new command is compared with the last received command. If there is a match, the subroutine at step 611 sets RC=SAME TARGET and exits at step 612. If the new command is different from the last received command, processing advances to step 605 where the CALC REPO TARGET subroutine is called.

CALC REPO TARGET

The CALC REPO TARGET subroutine calculates the position at which the magnetic tape must be prior to the initiation of the execution by tape transport 111 of the command stored in NEW COMMAND. This is accomplished by calculating the distance between the magnetic tape position at which the previously executed command (stored in OLD COMMAND) completed and the position at which the magnetic tape must be prior to the initiation of the newly received command (stored in NEW COMMAND). This distance is then added to the tape position value stored in END OF CMD POSITION to obtain a new tape position value that is stored in REPO TARGET.

Several techniques may be used to obtain the distance from the position at which the previous command completed and next command must start. In many applications, the distance values which are appropriate for each combination of OLD COMMAND and NEW COMMAND are constants. These constants can be stored in a two-dimensional array. To obtain a distance value for a particular pair of OLD COMMAND and NEW COMMAND, OLD COMMAND is used as one index of the array and NEW COMMAND is used as the other index of the array. The value stored at the intersection of these two indices is the desired distance value.

Another technique would involve the use of two one-dimensional arrays. One array would contain values to be added to the position stored in END OF CMD POSITION to obtain a standardized end of command position. OLD COMMAND would be used as the index of this array to obtain the value to be added to END OF CMD POSITION. To this standardized position would be added an offset obtained from the other one-dimensional array with the index being NEW COMMAND. The result would be stored in REPO TARGET.

At step 606, the tape position value stored in REPO TARGET is compared with the tape position value stored in DECEL TARGET to determine whether the magnetic tape needs to be repositioned. If the two compared tape position values match at step 606, processing advances to step 611 where the return code (RC) is set to SAME TARGET and the subroutine exits at step 612. If the compared tape position values do not match at step 606, processing advances to step 607 where the DECELERATING flag is checked.

If the DECELERATING flag is set, then DECEL TARGET already contains the position at which the magnetic tape will stop. Therefore, the steps of calculating a new value for STOP POSITION and comparing the new value with REPO TARGET are bypassed and processing advances to step 613. If the DECELERATING flag is not set, the subroutine CALC STOP POSITION is called.

CALC STOP POSITION

The CALC STOP POSITION subroutine calculates the position at which the magnetic tape will reach zero velocity if deceleration is initiated immediately or, if the magnetic tape is in the process of being decelerated, if deceleration is allowed to continue. This tape position is stored in the variable STOP POSITION and the new stop position which CALC STOP POSITION stored in STOP POSITION is copied into DECEL TARGET at step 609. If the new value in DECEL TARGET is equal to REPO TARGET at step 610, the subroutine returns with a return code of SAME TARGET at step 611. In this case, the target may not be the same as it had been previously, but when CHECK FOR NEW CMD is called with the DECELERATING flag reset and CHECK FOR NEW CMD returns SAME TARGET, the caller of CHECK FOR NEW CMD will immediately call CALC STOP POSITION, find that STOP POSITION has reached DECEL TARGET and initiate the deceleration of the magnetic tape. Therefore, returning SAME TARGET in this case leads to the caller of CHECK FOR NEW CMD handling the new REPO TARGET and DECEL TARGET positions correctly even though those positions may have changed.

If the new value in DECEL TARGET is not the same as REPO TARGET at step 610 or if the DECELERATING flag was found to be set above, then REPO TARGET is compared to DECEL TARGET at step 613. If REPO TARGET is not beyond DECEL TARGET, the subroutine returns with a return code of WILL OVERSHOOT at step 614 to indicate that once the tape velocity has reached zero at DECEL TARGET position, the magnetic tape will have to be accelerated in the opposite direction to cause it to be positioned at the new REPO TARGET position.

The test for one position being "beyond" another position is performed in several places in this algorithm. This test is specifically: if the direction of tape motion is forward and the first position is closer to the end of the magnetic tape than the second position, then the first position is beyond the second position. Similarly, if the direction of tape motion is backward and the first position is closer to the beginning of the magnetic tape than the second position, then the first position is beyond the second position. If neither of these conditions are true, the first position is not beyond the second position.

If REPO TARGET is beyond DECEL TARGET, at step 615 DECEL TARGET is loaded with REPO TARGET and the subroutine returns with a return code of MORE DISTANT TARGET at step 616 to indicate that the new REPO TARGET is beyond the point at which the magnetic tape would stop if deceleration were to begin immediately.

STOPLOCK Returns Value

Figure 6:
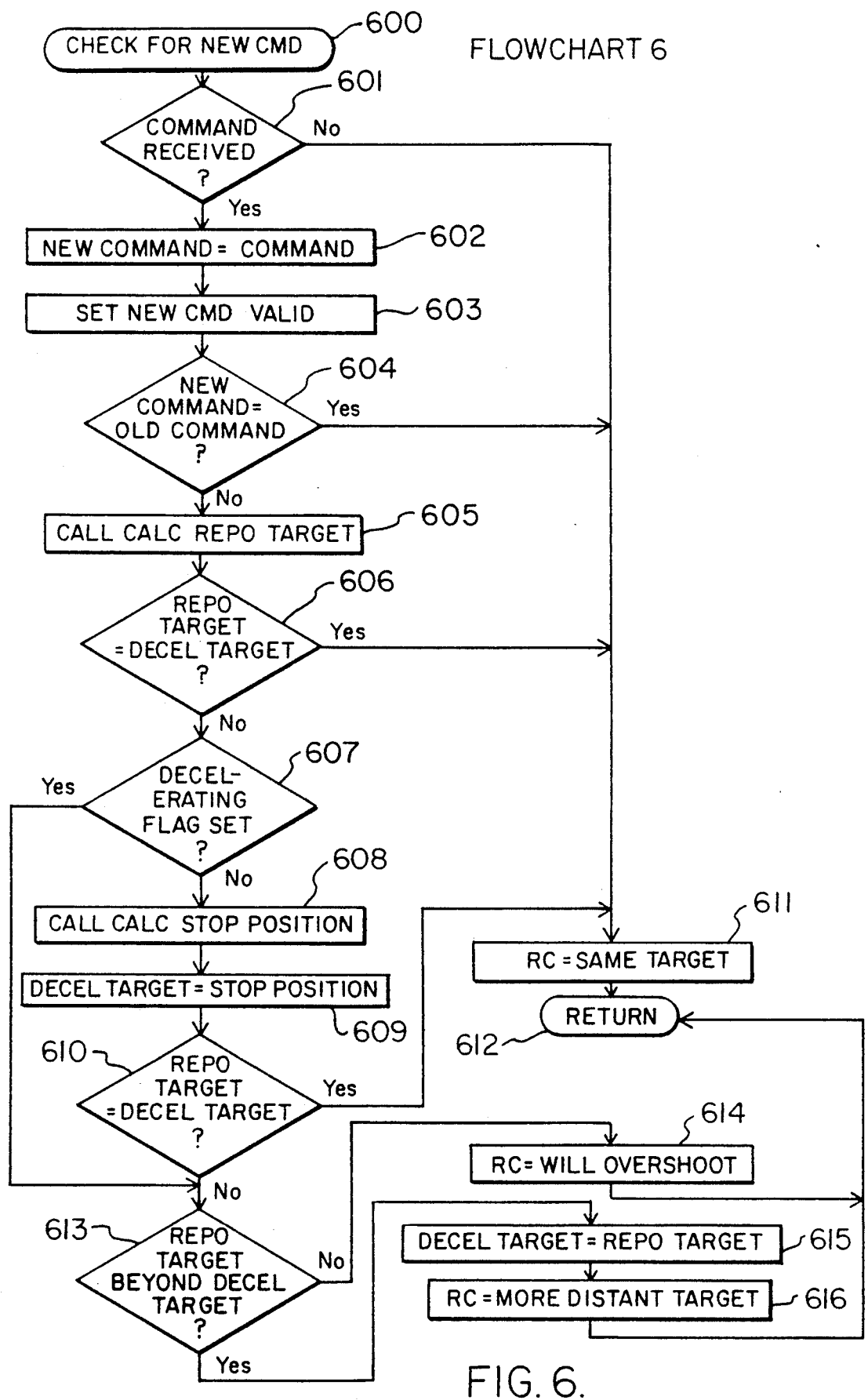

The result of the operation of the subroutine CHECK FOR NEW CMD illustrated on FIG. 6 is that a return code (RC) is provided to the STOPLOCK subroutine indicative of the new command received and the NEW CMD VALID flag is set to indicate the presence of a newly received command from tape control unit 100. At step 513, the NEW CMD VALID flag is checked to determine whether a new command was received and, if so, processing advances to step 514 where STOPLOCK sets its return code variable to the value received from the CHECK FOR NEW CMD subroutine and returns this value at step 515 to the basic servo control routine at step 501.

COMMAND EXECUTION

At step 502, the return code is checked to determine whether its value is SAME TARGET. If it is not, processing advances to step 505 described below where the magnetic tape is repositioned. However, if the return code is SAME TARGET, the magnetic tape is already positioned at the point appropriate for executing the new command. Processing advances to step 503 where the COMMAND EXECUTION subroutine is called.

Figure 7:
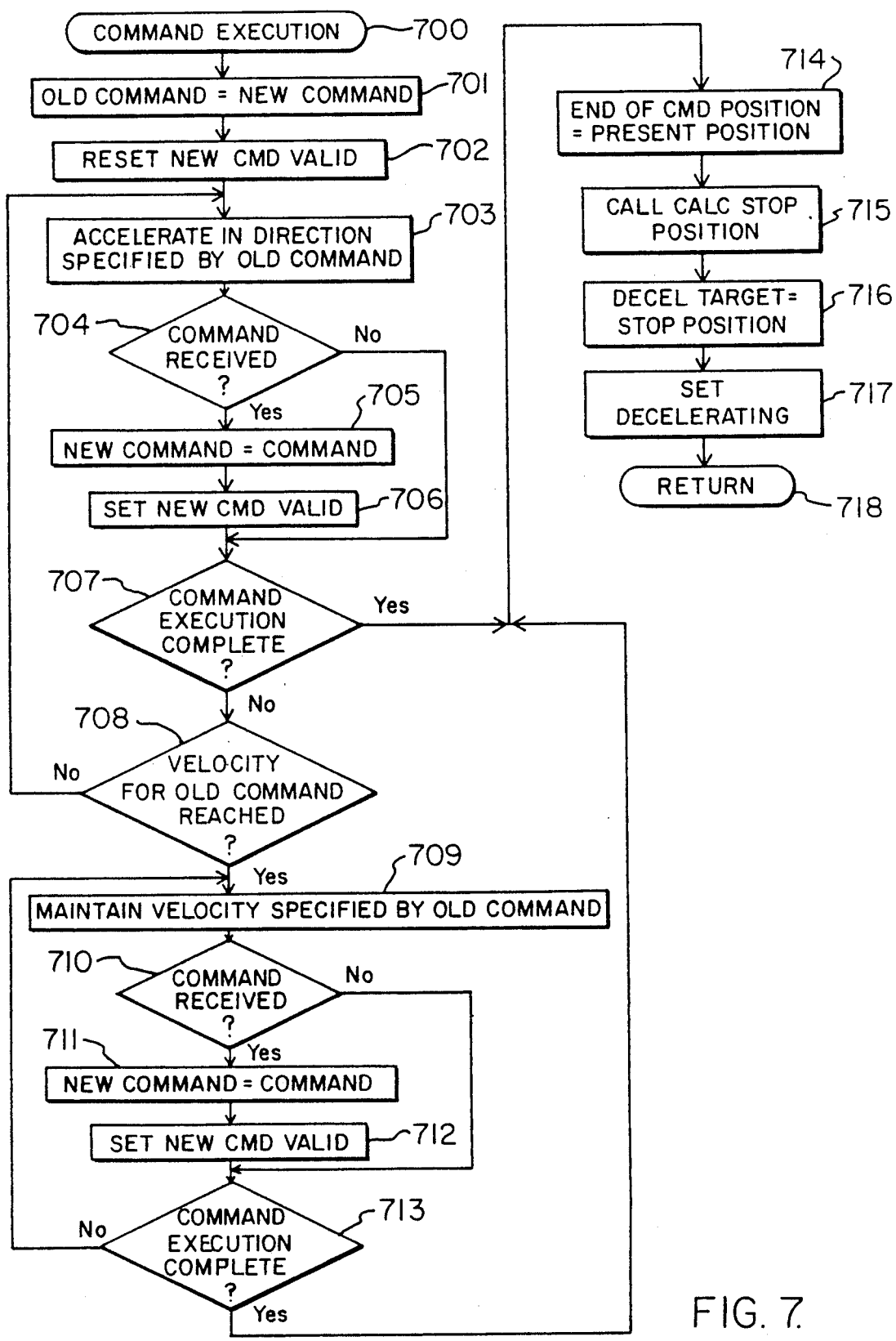

FIG. 7 shows the COMMAND EXECUTION subroutine. This subroutine starts at step 701 by copying the NEW COMMAND value into OLD COMMAND and at step 702 resetting the NEW COMMAND VALID bit. A loop is then entered in which at step 703 the magnetic tape is accelerated in the direction specified by OLD COMMAND until the velocity appropriate for OLD COMMAND is reached or the command execution is completed. The details of this acceleration process are not pertinent to this invention. This loop periodically tests at step 704 to see if a new command has been received. When a new command is received, it is stored at step 705 in NEW COMMAND and the NEW CMD VALID flag is set at step 706. Of course, in some applications, it may be impossible to receive a new command while executing a previous command. In this case, the tests for receiving a new command while executing this subroutine are not needed.

At step 707, the subroutine checks to determine whether the command execution is completed. If not, processing advances to step 708 where the velocity of the magnetic tape is checked. If the velocity specified by the OLD COMMAND has not been reached, i.e. the tape transport is still reaching operating speed, processing returns to step 703 where the steps 703-707 are again executed. If the comparison at step 708 yields a YES result, then the velocity specified by OLD COMMAND is reached and command execution is not yet complete, therefore a second loop is entered in which the velocity specified by OLD COMMAND is maintained at step 709. Again, a periodic test is made for the reception of a new command at step 710. If a new command is received, it is stored at step 711 in NEW COMMAND and the NEW CMD VALID flag is set at step 712.

When execution of the command completes at steps 707 or 713, the position of the magnetic tape at the completion of the command is stored in END OF CMD POSITION at step 714. This position will be used in the calculation of the position at which the magnetic tape should be before the execution of the next command starts. The CALC STOP POSITION subroutine is called at step 715. CALC STOP POSITION calculates the position at which the magnetic tape will be when its velocity reaches zero at the end of deceleration and then stores this position in STOP POSITION. When CALC STOP POSITION returns, the position which CALC STOP POSITION stored in STOP POSITION is copied into DECEL TARGET at step 716 and the DECELERATING flag is set at step 717. Finally, the subroutine returns at step 718.

END OF CMD DECELERATION

Once the COMMAND EXECUTION subroutine returns, processing advances to step 504 where the END OF CMD DECELERATION subroutine is called.

Figure 8:
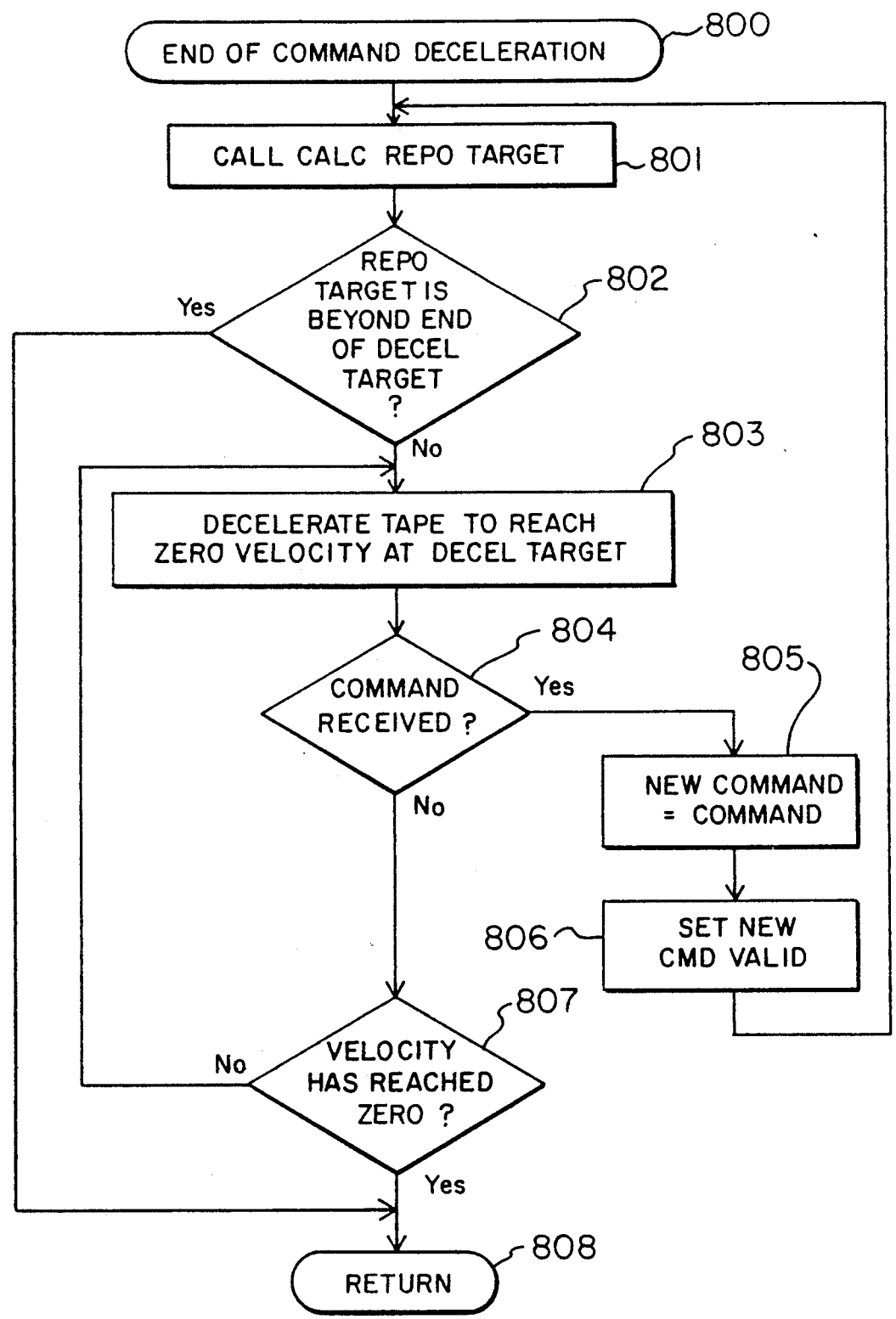

FIG. 8 shows the END OF CMD DECELERATION subroutine. This subroutine starts at step 801 by calling the CALC REPO TARGET subroutine which stores the position of the magnetic tape which is appropriate for the anticipated (or actual) next command in REPO TARGET. Then at step 802 REPO TARGET is compared to DECEL TARGET to determine whether REPO TARGET is beyond DECEL TARGET.

If REPO TARGET is beyond DECEL TARGET, then the subroutine immediately returns at step 808. This is because if the deceleration of the magnetic tape were to begin immediately, the magnetic tape would stop before it reached REPO TARGET.

If REPO TARGET is not beyond DECEL TARGET a loop is entered at step 803 in which the magnetic tape is decelerated until the tape velocity reaches zero or a new command is received. The details of the deceleration process are not pertinent to this invention. If a new command is received at step 804, the new command is stored in NEW COMMAND at step 805, the NEW CMD VALID flag is set at step 806 and control is transferred to the beginning of the subroutine where CALC REPO TARGET is called at step 801 to calculate the repositioning target appropriate for the new command. When tape velocity reaches zero at step 807 or a new command is received which causes REPO TARGET to be beyond DECEL TARGET, the subroutine returns at step 808.

REPOSITIONING

Once the END OF CMD DECELERATION subroutine returns, processing advances to step 505 where the REPOSITIONING subroutine is called. FIG. 9 shows the REPOSITIONING subroutine. When this subroutine is called, the magnetic tape is either at the DECEL TARGET position with the tape velocity being zero, it is being decelerated to reach zero velocity when it reaches DECEL TARGET, or it is moving toward the REPO TARGET position. This subroutine starts by comparing REPO TARGET to DECEL TARGET at step 901. If the two targets are equal, then no acceleration step is needed and control is transferred to the deceleration portion of the subroutine at step 915 (described below).

If REPO TARGET is not equal to DECEL TARGET, then the DECELERATING flag is reset at step 902 and DECEL TARGET is loaded with the contents of REPO TARGET at step 903. A loop is then entered in which the magnetic tape is accelerated toward the position stored in DECEL TARGET at step 904. That is, if the DECEL TARGET position is closer to the end of the magnetic tape than the present tape position, the magnetic tape is accelerated in the forward direction. If the DECEL TARGET position is closer to the beginning of the magnetic tape than the present tape position, the magnetic tape is accelerated in the backward direction. The details of the acceleration process are not pertinent to this invention. The acceleration loop periodically calls the CHECK FOR NEW CMD subroutine at step 905. If this subroutine returns the value WILL OVERSHOOT, then a new command has been received which caused REPO TARGET to be set to a position which can only be reached by decelerating the magnetic tape to zero velocity and then accelerating the magnetic tape in the opposite direction. In this case, the acceleration loop is exited at step 906, the REPOSITIONING subroutine's return code is set to RESTART DECEL at step 923 and REPOSITIONING returns at step 918.

If the return code from CHECK FOR NEW CMD is not WILL OVERSHOOT, then the CALC STOP POSITION subroutine is called at step 907. This subroutine calculates the position at which the tape velocity would reach zero if deceleration of the magnetic tape where to begin immediately. The position calculated by this subroutine is compared to DECEL TARGET at step 908 to determine whether deceleration should begin immediately. The test for "STOP POSITION has reached DECEL TARGET" is specifically: if STOP POSITION is equal to DECEL TARGET then STOP POSITION has reached DECEL TARGET. Also, if the magnetic tape is moving in the forward direction and STOP POSITION is closer to the end of the magnetic tape than DECEL TARGET, STOP POSITION has reached DECEL TARGET. Finally, if the magnetic tape is moving in the backward direction and STOP POSITION is closer to the beginning of the magnetic tape than DECEL TARGET, STOP POSITION has reached DECEL TARGET. If none of these conditions are true, then STOP POSITION has not reached DECEL TARGET. If STOP POSITION has reached DECEL TARGET, then deceleration should be started immediately to cause the magnetic tape to reach zero velocity at DECEL TARGET. The acceleration loop is exited at step 908 and preparations are made to initiate deceleration at step 915 (described below).

If STOP POSITION has not reached DECEL TARGET, at step 909 the absolute value of the present tape velocity is compared to the maximum velocity allowed during reposition operations. The choice of this MAX REPO VEL value is dependent on considerations outside the realm of this invention and MAX REPO VEL may be chosen to be infinity. If the tape velocity is less than MAX REPO VEL, control is transferred back to the top of the acceleration loop at step 904. Otherwise, a new loop is entered at step 910 which maintains the velocity of the tape at MAX REPO VEL.

The details of the first step of this loop, the maintenance of tape velocity at MAX REPO VEL, are not pertinent to this invention. This loop periodically calls CHECK FOR NEW CMD (step 911) and tests for a return code of WILL OVERSHOOT at step 912. As in the acceleration loop described above, if CHECK FOR NEW CMD returns WILL OVERSHOOT, the return code for the REPOSITIONING subroutine is set to RESTART DECEL at step 923 and the repositioning subroutine returns at step 918. If CHECK FOR NEW CMD does not return WILL OVERSHOOT, the CALC STOP POSITION subroutine is called at step 913. If STOP POSITION has not reached DECEL TARGET at step 914, the loop is repeated.

If STOP POSITION has reached DECEL TARGET at step 914, the loop which maintains MAX REPO VEL tape velocity is exited and the DECELERATING flag is set at step 915. Note that this point is also reached if STOP POSITION reached DECEL TARGET in the acceleration loop described above or if REPO TARGET was equal to DECEL TARGET on entry to the REPOSITIONING subroutine.

After the DECELERATING flag has been set, a deceleration loop is entered. The first test in this loop is step 916 for the tape velocity having reached zero. If the tape velocity has reached zero, the return code for the REPOSITIONING subroutine is set to DONE at step 917 and the REPOSITIONING subroutine returns at step 918. If the tape velocity has not reached zero, the magnetic tape is decelerated at step 919 at a rate which will cause it to reach zero velocity when the tape position reaches DECEL TARGET. The details of the deceleration process are not pertinent to this invention.

As in the previous two loops, this loop periodically calls CHECK FOR NEW CMD at step 920 and if CHECK FOR NEW CMD returns WILL OVER- SHOOT at step 921, the loop is exited, the return code for the REPOSITIONING subroutine is set to RESTART DECEL at step 923 and the REPOSITIONING subroutine returns at step 918. If CHECK FOR NEW CMD returns MORE DISTANT TARGET at step 922, a new command has been received which caused REPO TARGET to be set to a position which is beyond the position at which the magnetic tape will stop (DECEL TARGET). To reach the new REPO TARGET position, the deceleration loop is exited at step 922 and control is transferred at step 902 to the code which loads DECEL TARGET from REPO TARGET, resets the DECELERATING flag and accelerates the magnetic tape toward the new DECEL TARGET position (as described above). If the return code from CHECK FOR NEW CMD is not WILL OVERSHOOT or MORE DISTANT TARGET, then the deceleration loop of steps 916–922 is repeated.

REPOSITIONING returns RESTART DECEL at step 506 when a new command has been received and direction of the motion of the magnetic tape must be reversed in order to reach the position appropriate for the new command. In this case, control is transferred back to the END OF CMD DECELERATION subroutine at step 504.

When REPOSITIONING returns the value DONE, a test is made at step 507 to determine whether to start command execution immediately or to wait. The details of this test are implementation dependent. Generally, if no new command has been received, COMMAND EXECUTION will not be started and control is transferred to the STOPLOCK routine. In some applications, if a new command has been received prior to this test being made, it is appropriate for command execution to begin immediately. In other applications, when a new command is received and the magnetic tape is not in the position appropriate for the immediate initiation of the command, the command is rejected. When the position of the magnetic tape reaches the position appropriate for the new command, the tape transport must wait until the command is reissued before it starts execution of the command.

PROGRAM SUMMARY

The above-described procedures enumerate various magnetic tape repositioning situations that are commonly encountered. In order to elaborate on this control structure, the following description provides timing diagrams that show tape position and velocity for a number of magnetic tape repositioning operations:

ROUTINE TAPE REPOSITIONING

Figure 2:
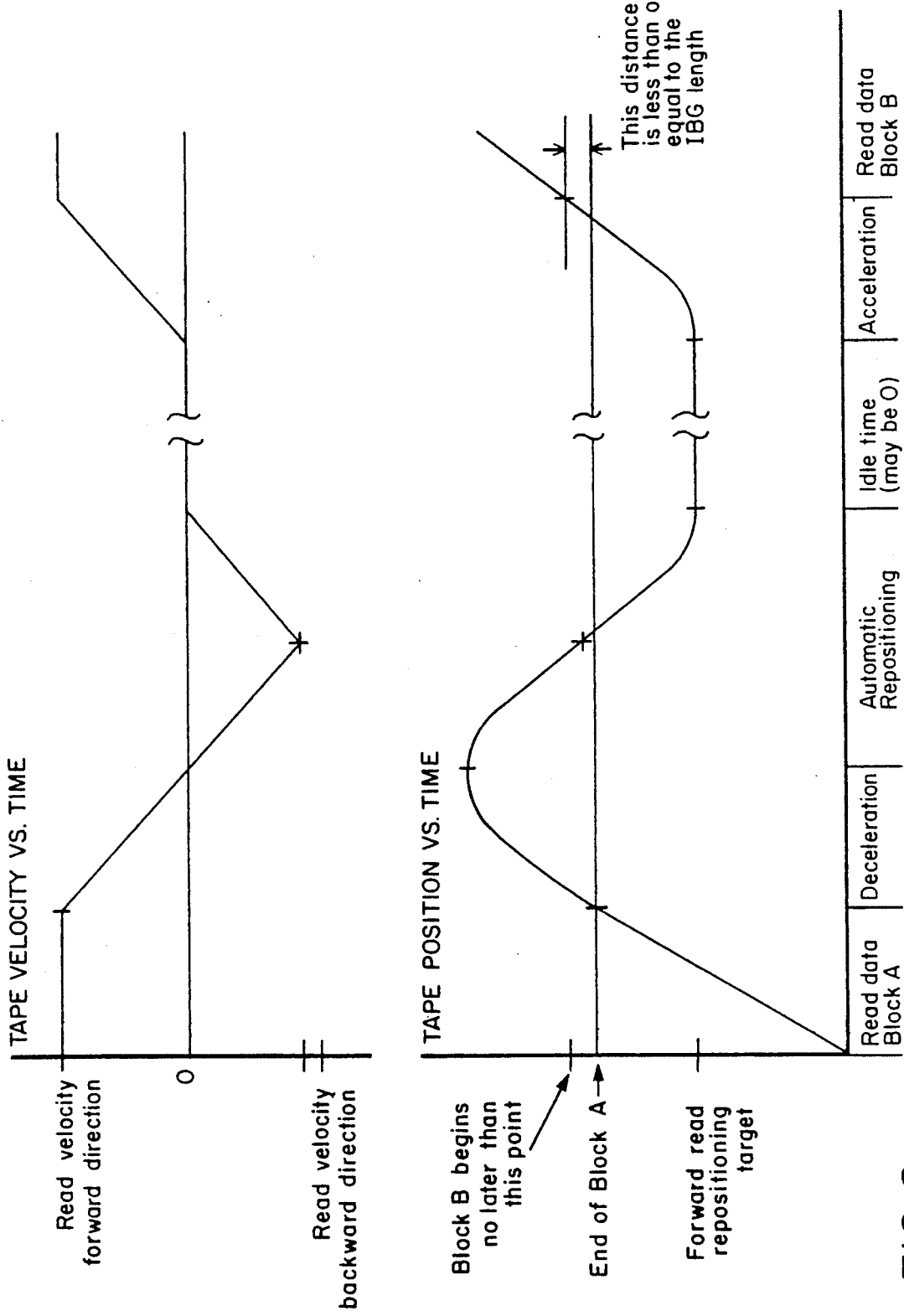
FIG. 2 illustrates a timing diagram that shows tape velocity and position in a normal read forward operation followed by a subsequent read forward operation.

FIG. 2 illustrates a timing diagram that shows the tape velocity and tape position as a function of time in a standard magnetic tape repositioning operation wherein a read operation in a forward direction is followed by subsequent timewise delayed read operation also in the forward direction. In FIG. 2, the top diagram illustrates tape velocity as a function of time while the lower diagram illustrates the position of the magnetic tape as a function of time. Along the horizontal axis just below the second diagram is a listing of the various operations that take place on the tape transport (ex. 111). The first timing diagram in FIG. 2 contains two notations along the vertical axis and these are: read velocity-forward direction at the top and read velocity-backward direction at the bottom of the vertical axis. These two points illustrate the read velocity of the magnetic tape in the two directions that tape transport 111 can operate the magnetic tape. 33 FIG. 2 as read data block A, the velocity of the magnetic tape as illustrated by the top diagram of FIG. 2, indicates a constant fixed read velocity in the forward direction. When the end of data block A is reached, tape control unit 101 reduces the tape velocity by transmitting control signals over control lead 141 to tape transport 111 to begin decelerating the magnetic tape to a stop. The response of the tape transport to these control signals is illustrated by the negative slope straight line on the tape velocity diagram during the deceleration interval as noted along the horizontal axis along the bottom of FIG. 2. When the tape velocity reaches the zero axis of the top diagram of FIG. 2, the magnetic tape has is stopped at a point past the end of data block A on the magnetic tape.

In order to reposition the magnetic tape so that the data block adjacent to data block A can be read beginning at the data block boundary, the magnetic tape must be repositioned so that the tape transport 111 can bring the magnetic tape up to the appropriate read velocity before the beginning of data block B is reached on the magnetic tape. This requires that the magnetic tape be backed up a certain predetermined distance from its present position. The position of the magnetic tape as a function of time is illustrated by the second diagram on FIG. 2. The horizontal axis on this diagram illustrates the end of data block A and the point on the vertical axis just above this point indicates the beginning of data block B. As can be seen from this magnetic tape position diagram, at the point in time where the velocity of the magnetic tape has reached zero, the position of the magnetic tape is advanced a significant distance past the beginning of data block B as illustrated by the point on the vertical axis of the tape position diagram. The magnetic tape must be repositioned so that the tape position opposite the read head is a sufficient distance before the beginning of data block B so that when the tape transport begins a timewise subsequent read operation, the tape transport can get the velocity of the magnetic tape up to the forward direction read velocity by the time the beginning of data block B reaches the point opposite the read head. Thus, during the automatic repositioning time interval illustrated along the horizontal axis, tape transport 111 accelerates the tape in the reverse direction as illustrated by the negative sloped straight line from the zero horizontal axis of the tape velocity diagram to just less than the read velocity-backward direction. The full read velocity-backward direction is not reached because the magnetic tape does not contain juxtaposed data blocks but there is an inter-block gap between data block A and data block B. Therefore, the tape transport has the inter-block gap distance to also accelerate through before reaching the boundary of data block B. This inter-block gap distance is accounted for by the negative slope tape velocity curve not exactly reaching the negative read forward velocity point on the vertical axis.

When this predetermined reverse position point is reached, tape transport 111 again decelerates the magnetic tape to a full stop. This deceleration portion of the repositioning curve is illustrated by the upwardly sloping straight line that reaches to the zero horizontal axis of the tape velocity diagram. The tape position diagram illustrates the effect of the automatic repositioning cycle. The position of the magnetic tape goes from the point at which the magnetic tape stopped at the end of the initial deceleration cycle back to a point labeled on the vertical axis of the tape position diagram as forward read repositioning target. This forward read repositioning target is a predetermined distance from the beginning of data block B. This forward read repositioning target position is reached at the end of the automatic repositioning operation and the magnetic tape remains in this position for the duration of the idle time interval which is the time delay between the end of the present read operation on data block A and a timewise subsequent read operation for data block B.

The subsequent read operation for data block B is illustrated by the two intervals on the horizontal axis labeled acceleration and read data block B. The acceleration cycle begins when tape drive control unit 101 transmits control signal over control lead 141 to tape transport 111 to begin accelerating the magnetic tape to the forward read velocity. This occurs during the acceleration time interval and is illustrated on the tape velocity diagram by an upwardly sloping straight line from the zero horizontal axis to the forward read velocity point on the vertical axis. The corresponding tape position diagram illustrates the coordination of the tape velocity and tape position by the use of this repositioning function. In this example, the tape velocity reaches the forward read velocity at a point in time where the position of the magnetic tape is such that the beginning of data block B is opposite the read head. The magnetic tape remains at the read velocity in the forward direction for the duration of the data read operation for data block B and the tape position diagram illustrates that block B is read from its beginning along the entirety of its length over the course of time.

It is obvious from this timing diagram that a significant amount of time is occupied by the tape transport decelerating the magnetic tape from its read velocity in the forward direction speed to a complete stop at the zero axis crossing point and then repositioning the magnetic tape in a subsequent acceleration in the reverse direction and deceleration again to a stop at a predetermined position. Thus, the magnetic tape reaches the required read velocity in the forward direction at exactly the point in time when the beginning of data block B is opposite the read head. The elapsed time required for this repositioning is illustrated in FIG. 2 by the automatic repositioning time interval on the horizontal axis. The discussion of the remaining Figures will illustrate the time saving that can be accomplished by minimizing or completely eliminating the automatic repositioning cycle for cases where a subsequent operation is queued in tape control unit 101 so that tape control unit 101 has information that describes the subsequent operation required of tape transport 111.

READ FORWARD TO READ BACKWARD DIRECTION REVERSAL

Figure 3:
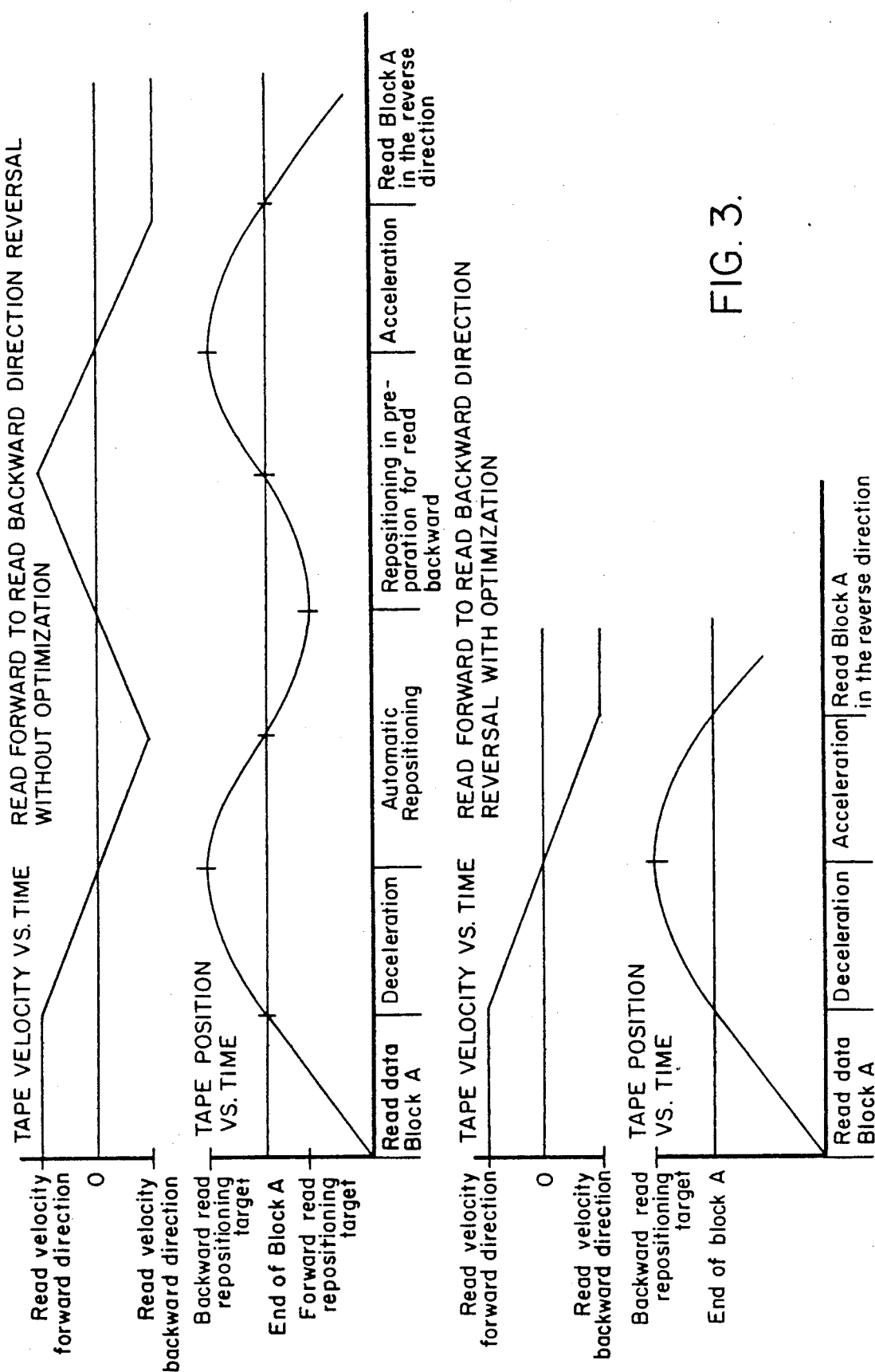
FIG. 3 illustrates a timing diagram that shows tape velocity and position of a read forward to read backward direction reversal both with and without optimization.

FIG. 3 Illustrates a timing diagram that shows the tape velocity and position as a function of time for a direction reversal situation where a transition is made from reading the magnetic tape in a forward direction to reading the magnetic tape in a reverse direction. To simplify the description of this case, the assumption is made that the read velocity-backward direction is equal to the negative of the read velocity-forward direction and that the rate at which the tape is decelerated is equal to the rate at which it is accelerated. In FIG. 3, the first and second diagrams illustrate tape velocity and tape position respectively as a function of time for the magnetic tape in the case where there is no optimization apparatus. The remaining two diagrams illustrate tape velocity and tape position respectively as a function of time for the case where the optimization apparatus is operational to more efficiently regulate the operation of tape transport 111. The first three time segments, read block A, deceleration, automatic repositioning of the first two diagrams of FIG. 3 are identical to that described above with respect to FIG. 2. This is the traditional deceleration and repositioning operation for the magnetic tape. However, this operation described above with respect to FIG. 2 and as illustrated in the first three time segments of FIG. 3 are for a read in the forward direction followed by a timewise delayed read also in the forward direction. The operation illustrated here is a direction reversal where the timewise subsequent read is in the reverse direction, not the forward direction. Therefore, the automatic repositioning that was performed by tape transport 111 has placed the position of the magnetic tape in an inappropriate location for a read in the reverse direction. The fourth time segment illustrated in FIG. 3 for the first two diagrams is a repositioning operation that repositions the magnetic tape for a read in the reverse direction. This operation is analogous to the automated repositioning operation described above but the velocity and position diagrams are in the reverse direction. Therefore, tape transport 111 must accelerate the magnetic tape to read velocity in the forward direction followed by a deceleration to zero to reposition the magnetic tape opposite the read head a sufficient distance from the end of data block A so that when tape transport 111 accelerates the magnetic tape to the read velocity in the reverse direction, this velocity is reached at exactly the time that the end of data block A is opposite the read head. The fifth time interval illustrated in FIG. 3 for the first two diagrams is an acceleration cycle where tape transport 111 accelerates the magnetic tape from a stop or zero velocity up to read velocity in the reverse direction as illustrated in the first diagram vertical axis data point. The corresponding tape position as a function of time diagram illustrates that end of data block A is opposite the read head at exactly the same time as the read velocity in the reverse direction is reached. Tape transport 111 then maintains the read velocity in the reverse direction at a constant level for the time interval listed as read block A in the reverse direction.

It is obvious from the first two diagrams of FIG. 3 that a significant amount of repositioning has occurred to prepare tape transport 111 for the subsequent read in the reverse direction. Tape transport 111 executed an automatic repositioning cycle as well as a repositioning for the read in the reverse direction cycle in order to properly position the magnetic tape opposite the read head. The third and fourth diagrams of FIG. 3 illustrate the magnetic tape velocity and position as a function of time for the direction reversal from a read in the forward direction to a read in the reverse direction but with the operation of the optimization apparatus. In this situation, tape control unit 101 has received information indicative of the nature of the timewise subsequent operation. This subsequent operation is a read in the reverse direction of data block A which is the data block presently being read by tape transport 111 in the forward direction. In this case, tape control unit 101 transmits control signals over control leads 141 to tape transport 111 to completely abort the automatic repositioning cycle. It is assumed for tape transport 111 that the rate of acceleration is identical to the rate of deceleration. Thus, as shown in the third and fourth timing diagrams of FIG. 3, once the end of data block A is reached, tape control unit 101 transmits a control signal over control leads 141 to tape transport 111 to decelerate the magnetic tape to zero as indicated by the downwardly sloping straight line from read velocity in the forward direction vertical axis data point down to the zero horizontal axis on the tape velocity as a function of time diagram. The tape position diagram just below the velocity diagram illustrates that at the end of this deceleration cycle, the tape position is at a point noted as the read in the reverse direction repositioning target. Thus, by the time the magnetic tape has been stopped, it is in the exact position required for tape transport 111 to accelerate it to proper velocity to begin reading data block A in the reverse direction. This is further illustrated by the third time interval noted as acceleration time interval in FIG. 3. During this acceleration time interval, tape transport 111 accelerates the magnetic tape from zero velocity up to read velocity in the reverse direction as noted on the vertical axis of the tape velocity diagram. As can be seen from the third and fourth diagrams of FIG. 3, the tape velocity reaches a read velocity in the reverse direction point at exactly the same time as the end of data block A is opposite the read head of tape transport 111.

Thus, it is evident from FIG. 3 that a significant amount of time is saved by the optimization apparatus in the case where tape transport 111 sequences between a read magnetic tape in one direction to a read magnetic tape in the reverse direction operation. As was noted above, this type of operation is frequently encountered when tape control unit 101 is attempting to recover from an error in the read process.

READ FORWARD TO WRITE FORWARD—MODE CHANGE

Figure 4:
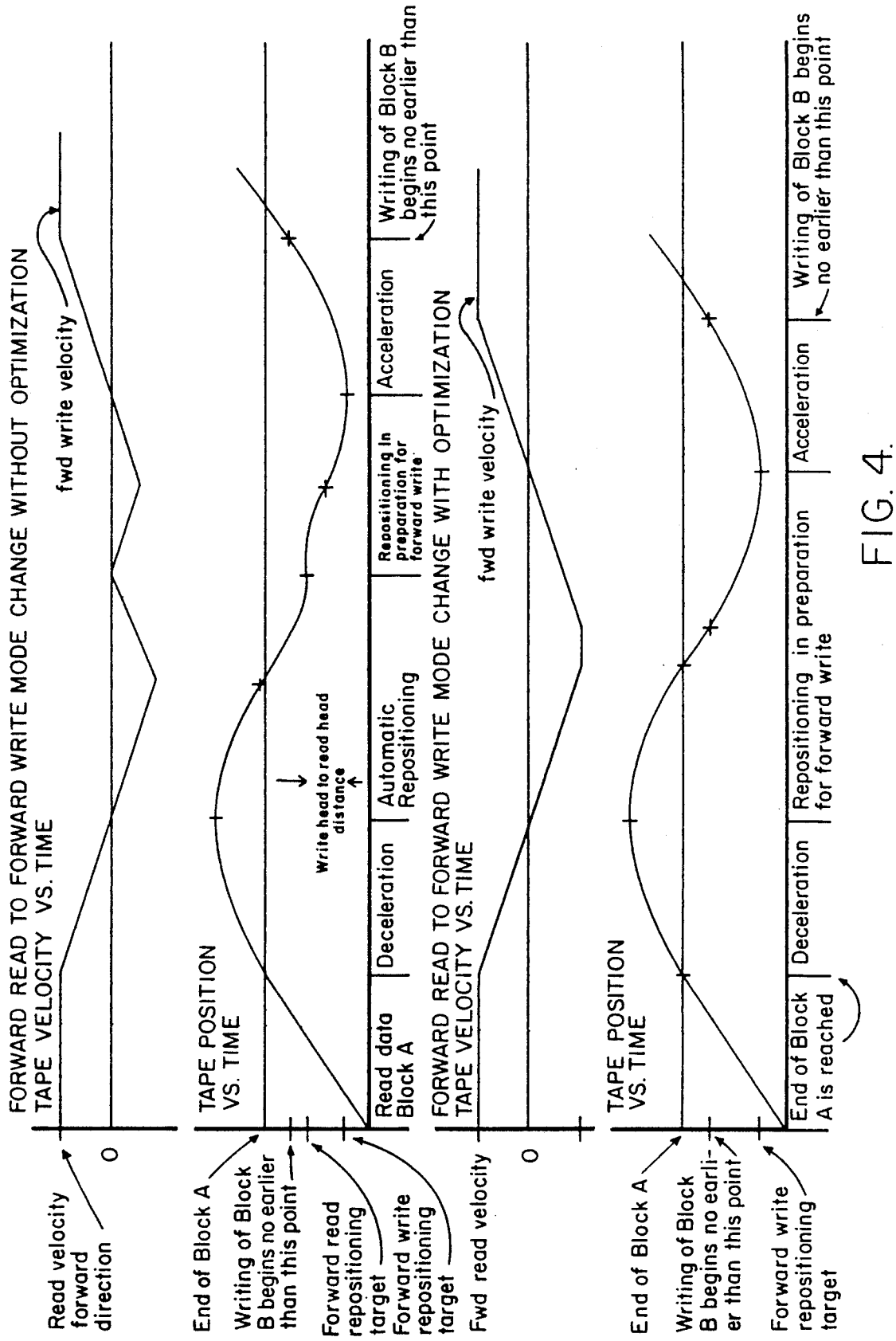
FIG. 4 illustrates a timing diagram that shows tape velocity and position in a forward read to forward write mode change operation both with and without optimization.

FIG. 4 illustrates a timing diagram that shows the tape velocity and position as a function of time for a mode change situation where the magnetic tape is switched from being read in the forward direction to being written in the forward direction. In FIG. 4, the first and second diagrams illustrate tape velocity and tape position respectively as a function of time for the magnetic tape in the case where there is no optimization apparatus. The remaining two diagrams illustrate tape velocity and tape position respectively as a function of time for the case where the optimization apparatus is operational to more efficiently regulate the operation of tape transport 111. The first three time segments, read data block A, deceleration, automatic repositioning in the first two diagrams of FIG. 4 are identical to that described above with respect to FIG. 2. This is the traditional deceleration and repositioning operation for the magnetic tape. The operation illustrated here is a mode change where the timewise subsequent operation is a write in the forward direction, not a read in the forward direction. Since the read and write heads are some distance apart on tape transport 111, the automatic repositioning that was performed by tape transport 111 has placed the position of the magnetic tape in an inappropriate location for a write in the forward direction. Therefore, the magnetic tape must be repositioned so that the magnetic tape, when accelerated to forward-write velocity, reaches this velocity at the same point in time when the beginning of data block B is opposite the write head of tape transport 111. The fourth time segment illustrated in FIG. 4 for the first two timing diagrams is a repositioning operation that repositions the magnetic tape for a write in the forward direction. This operation is analogous to the automated repositioning operation described above with respect to FIGS. 2 and 3. The repositioning operation entails tape transport 111 accelerating the magnetic tape in a reverse direction and then decelerating the magnetic tape to a stop so that the magnetic tape is backed up a sufficient distance so that the beginning of data block B is a predetermined distance away from the write head of tape transport 111. This predetermined distance is indicated on the vertical axis of the second timing diagram as "Forward Write Repositioning Target". The fifth time interval illustrated in FIG. 4 for the first two timing diagrams is the acceleration cycle where tape transport 111 accelerates the magnetic tape from a stop or zero velocity up to a write velocity in the forward direction as illustrated in the first diagram vertical axis data point. The corresponding tape position as a function of time diagram illustrates that the beginning of data block B is opposite the write head at exactly the same point in time as the write velocity in the forward direction is reached. Tape transport 111 then maintains write velocity in the forward direction at a constant level for the entire time that data is written into data block B.

It is obvious from the first two diagrams of FIG. 4 that a significant amount of repositioning has occurred to prepare tape transport 111 for the subsequent write in the forward direction. Tape transport 111 executed an automated repositioning cycle as well as a repositioning for a write in the forward direction cycle in order to properly position the magnetic tape opposite the write head. The third and fourth diagrams of FIG. 4 illustrate the magnetic tape velocity and position as a function of time for the mode change for a read in the forward direction to a write in the forward direction but with the operation of the optimization apparatus. In this situation, the end of data block A is reached, tape deceleration is started and tape control unit 101 has received information indicative of the nature of the timewise subsequent operation. This subsequent operation is a write in the forward direction of data block B, which is the data block immediately adjacent to the data block presently being read by tape transport 111 in the forward direction. In this case, tape control unit 101 transmits control signals over control leads 141 to tape transport 111 to completely abort the automatic repositioning cycle. It is assumed for tape transport 111 that the rate of acceleration is identical to the rate of deceleration. Thus, as shown in the third and fourth timing diagrams of FIG. 4, once the end of data block A is reached, tape control unit 101 transmits the control signal over control leads 141 to tape transport 111 to decelerate the magnetic tape to zero as indicated by the downwardly sloping straight line from read velocity in the forward direction vertical axis data point down to the zero horizontal axis on the tape velocity as a function of time diagram. The tape position diagram just below the velocity diagram on FIG. 4 illustrates that at the end of this deceleration cycle, the tape position is at a point noted as the read in the reverse direction repositioning target. However, this is not the proper position for the subsequent operation which is a write in the forward direction. Therefore, the magnetic tape must be repositioned at this point so that the next operation can be carried out immediately. The tape transport mode/direction change optimization apparatus can perform this repositioning of the magnetic tape in a single operation based on the data in the tape control unit 101 of the nature of the timewise subsequent operation. This repositioning operation is similar to the automatic repositioning operation that is executed by tape transport 111 for the timewise subsequent operation that is identical to the presently executing operation. This is because the timewise subsequent operation is similar in nature to the presently executing operation in that both operations are in the same direction and there is only a change of mode required. This change of mode necessitates a modification of the automatic positioning operation since the read and write heads are in slightly different locations on tape transport 111. The read head and the write head are located adjacent to one another a certain distance apart. Therefore, the repositioning required of the tape transport mode/direction change optimization apparatus must take into account the difference in position between the read and the write heads. This is accomplished by tape transport 111 accelerating the magnetic tape in the reverse direction as indicated by the downwardly sloping line on the magnetic tape velocity as a function of time diagram in FIG. 4. The tape transport accelerates the magnetic tape from zero velocity (zero crossing on the horizontal axis) to a certain fixed velocity in the reverse direction indicated by the horizontal line in the third timing diagram of FIG. 4. Tape transport 111 maintains this fixed velocity until a predetermined point is reached at which the tape transport decelerates the magnetic tape to a stop. This deceleration operation is indicated by the vertically sloping line from the fixed velocity horizontal line in the third timing diagram to the zero crossing point on the horizontal axis. The fourth timing diagram indicative of tape position as a function of time for this repositioning operation indicates that the magnetic tape is moved in the reverse direction past the end of data block A to a point indicated as the forward write repositioning target point which is reached at exactly the same time that the magnetic tape reaches a zero velocity or a stop. Thus, by the time the magnetic tape has been stopped, it is in the exact position required for tape transport 111 to accelerate it to the proper velocity to begin writing data block B in the forward direction. This operation can immediately begin upon the conclusion of the repositioning cycle illustrated by the third time interval in FIG. 4. This subsequent operation is initiated by tape control unit 101 transmitting a control signal over lead 141 to tape transport 111 to accelerate the magnetic tape up to write velocity in the forward direction speed. Tape transport 111 responds to this control signal by accelerating the magnetic tape as illustrated by the vertically sloping line on the third timing diagram of FIG. 4 from the zero crossing point up to write velocity in the forward direction point. As can be seen from the fourth timing diagram of FIG. 4 which is a plot of tape position as a function of time, the write velocity in the forward direction is reached at exactly the same point in time as the beginning of data block B is opposite the write head of tape transport 111. It is obvious from the comparison of the first two timing diagrams of FIG. 4 with the third and fourth timing diagrams that the tape transport mode/direction change optimization apparatus does provide a savings in time over the mode change repositioning operation of tape transport 111 without optimization. This savings in time is not as dramatic as for the case discussed above with respect to FIG. 3 but does represent a significant time savings for tape transport 111.

The above two examples illustrate some of the time savings that can be obtained by the use of the tape transport mode/direction change optimization apparatus. These two examples illustrate the case where tape control unit 101 received instructions to originate a subsequent operation before the presently executing operation had been completed. Therefore, the full time savings could be obtained by tape control unit 101 since the automatic repositioning cycle had not been initiated. It is obvious that if the automatic repositioning cycle had already been initiated when tape control unit 101 received instructions to initiate a subsequent operation that differed in mode or direction from the presently executing operation that some time savings could still be obtained by aborting the automatic repositioning cycle and instead activating the tape transport mode/change optimization apparatus to position the magnetic tape in exactly the position required of this subsequent operation.

I claim:

1. In a tape drive including a tape transport for directionally reading/writing data records on a magnetic tape, where a predefined magnetic tape repositioning operation is executed by said tape transport at the conclusion of the presently executing data record read/write operation to position said magnetic tape such that said tape transport completes its magnetic tape acceleration to perform a subsequent read/write operation at a location on said magnetic tape substantially at the end of said presently read/written data record, a magnetic tape repositioning control apparatus in said tape drive system comprising:

means for storing a tape drive control command received subsequent to the receipt of said presently executing data record read/write operation and prior to the completion of said presently executing data record read/write operation, inclusive of said predefined magnetic tape repositioning operation; and means of modifying said repositioning operation to position, in a single step, said magnetic tape for immediate execution of said subsequently received tape drive control command upon the completion of said modified repositioning operation.

2. The apparatus of claim 1 wherein said modifying means comprises:

means for storing a plurality of sets of data, each of said stored sets of data indicative of a magnetic tape repositioning operation, said sets of data addressable by identification of the presently executing data record read/write operation and said subsequently received tape drive control command.

3. The apparatus of claim 2 wherein said modifying means further comprises:

means responsive to the completion of said presently executing read/write operation for retrieving one of said sets of data from said storing means using the identification of said presently executing data record read/write operation and said subsequently received tape drive control command;

means responsive to said retrieved set of data for regulating the operation of said tape transport to reposition said magnetic tape in a position to immediately execute said subsequently received tape drive control command upon the completion of said repositioning operation.

4. The apparatus of claim 3 further including:

means responsive to said regulating means for activating said tape transport to execute said subsequently received tape drive control command.

5. In a tape drive for reading/writing data records on a magnetic tape, control apparatus for regulating the repositioning of said magnetic tape at the conclusion of a presently executing read/write operation, where said tape drive executes a predefined magnetic tape repositioning step at the conclusion of the presently executing data record read/write operation to position said magnetic tape such that said tape drive completes its magnetic tape acceleration to perform a subsequent read/write operation at a location on said magnetic tape substantially at the end of said presently read/written data record, comprising:
   means responsive to the receipt of a tape drive control command subsequent to the receipt of the presently executing data record read/write operation and prior to the completion of said predefined magnetic tape repositioning operation for storing said received tape drive control command;
   means responsive to a received tape drive control command for disabling said predefined magnetic tape repositioning step;
   means for determining the stop position of said magnetic tape required to immediately execute said received tape drive control command upon the completion of said presently executing data record read/write operation; and
   means responsive to said determining means for activating said tape drive to position said magnetic tape at said stop position upon the completion of said presently executing data record read/write operation.

6. The apparatus of claim 5 further including:
   means responsive to said activating means for enabling said tape transport to immediately execute said tape drive control command when said magnetic tape is positioning at said stop position.

7. The apparatus of claim 5 wherein said determining means includes:
   memory means for storing data indicative of the stop position for a plurality of received tape drive control commands.

8. The apparatus of claim 7 wherein said memory means is addressable by data indicative of both said presently executing read/write operation and said tape drive control command.

9. In a tape drive system including a tape transport having read/write heads for bidirectionally read/writing data records that are stored seriatim in juxtaposed position on a magnetic tape located on said tape transport, a magnetic tape repositioning control apparatus to position said magnetic tape such that said tape transport completes its magnetic tape acceleration to perform a subsequent read/write operation at a location on said magnetic tape substantially at the end of said presently read/written data record, comprising:
   means for storing a tape drive control command received subsequent to the receipt of said presently executing data record read/write operation and prior to the completion of said presently executing data record read/write operation, inclusive of a predetermined magnetic tape repositioning step;
   means responsive to said presently executing data record read/write operation and said stored tape drive control command for determining the position on said magnetic tape that must be located opposite the read/write heads of said tape transport to enable said tape transport to immediately execute said stored tape drive control command upon the completion of said presently executing data record read/write operation; and
   means responsive to said determining means for transmitting repositioning control signals to said tape transport to control the operation of said tape transport to locate said determined magnetic tape position opposite said read/write heads;
   means for activating said tape transport to execute said received tape drive control command.

10. In a tape drive system, including a tape transport, for reading/writing data records on a magnetic tape, a tape drive control apparatus comprising:
    means responsive to the conclusion of a presently executing data record read/write operation for stopping and repositioning said magnetic tape to position said magnetic tape such that said tape transport completes its magnetic tape acceleration to perform a subsequent read/write operation at a location on said magnetic tape substantially at the end of said presently read/written data record;
    means responsive to said tape drive system receiving a tape drive control command before the completion of said magnetic tape repositioning for storing said received tape drive control command; and
    means responsive to said received tape drive control command not requiring access to said magnetic tape at said location substantially at the end of said last read/written data record for disabling said repositioning means.

11. The apparatus of claim 10 further comprising:
    means responsive to said received tape drive control command for determining a new magnetic tape repositioning location to immediately execute said received tape drive control command upon the completion of said stopping and repositioning said magnetic tape at said new magnetic tape repositioning location.

12. The apparatus of claim 11 further comprising:
    means responsive to said determining means for translating said new magnetic tape repositioning location into control signals to regulate the operation of said tape transport to locate said magnetic tape at said new magnetic tape repositioning location.

13. The apparatus of claim 12 further comprising:
    means responsive to said translating means for transmitting said control signals to said tape transport upon the completion of said presently executing data record read/write operation to activate said tape transport to reposition said magnetic tape at said new magnetic tape repositioning location.

14. In a tape drive system where a tape drive control regulates the operation of a tape transport to read/write data records on a magnetic tape loaded on said tape transport where said tape transport executes a predefined magnetic tape repositioning step at the conclusion of the presently executing data record read/write operation to position said magnetic tape such that said tape transport completes its magnetic tape acceleration to perform a subsequent read/write operation at a location on said magnetic tape substantially at the end of said presently read/written data record, a method of repositioning said magnetic comprising the steps of:
   storing a tape drive control command received prior to the completion of said presently executing data record read/write operation, inclusive of said predefined magnetic tape repositioning step;

modifying said predefined repositioning step as a function of said stored tape drive control command; and repositioning said magnetic tape using said modified repositioning step upon the completion of said presently executing data record read/write operation.

15. The method of claim 14 further including the step of:

activating said tape transport to execute said stored tape drive control command upon the completion of said magnetic tape repositioning using said modified repositioning step.

16. The method of claim 14 wherein the step of repositioning includes the step of:

determining the position of said magnetic tape necessary to immediately execute said stored tape drive control command without additional magnetic tape repositioning.

17. The method of claim 16 wherein the step of repositioning further includes:

converting said determined position into tape transport control commands to position said magnetic tape at said determined position.

18. The method of claim 17 wherein the step of repositioning further includes the step of:

transmitting said tape transport control commands to said tape transport upon the completion of said presently executing data record read/write operation to activate said tape transport to execute said magnetic tape repositioning step.

19. The method of claim 16 wherein the step of determining includes the step of:

storing in a memory a plurality of sets of data, each set of data indicative of a unique magnetic tape repositioning location as a function of tape drive control command and presently executing data record read/write operation.

20. The method of claim 19 further including the step of:

addressing said memory using said presently executing data record read/write operation and said stored tape drive control command to retrieve a set of data indicative of a unique magnetic tape repositioning location to immediately execute said stored tape drive control command without further repositioning of said magnetic tape.

21. In a tape drive system where a tape drive control regulates the operation of a tape transport to read/write data records on a magnetic tape loaded on said tape transport, a method of repositioning said magnetic tape upon the completion of a presently executing read/write operation to position said magnetic tape such that said tape transport completes its magnetic tape acceleration to perform a subsequent read/write operation at a location on said magnetic tape substantially at the end of said presently read/written data record, comprising the steps of:

storing a tape drive control command received during the executing of said presently executing read/write operation, inclusive of a predefined magnetic tape repositioning step;

storing in a memory a plurality of magnetic tape position data indicative of magnetic tape repositioning location as a function of stored tape drive control command and presently executing read/write operation;

addressing said memory using said presently executing read/write operation and said stored tape drive control command to retrieve data indicative of a magnetic tape repositioning location to immediately execute said stored tape drive control command upon the completion of said presently executing read/write operation;

converting said retrieved data into tape transport control commands to position said magnetic tape at said determined position;

transmitting said tape transport control commands to said tape transport upon the completion of said presently executing read/write operation to activate said tape transport to position said magnetic tape at said determined position; and activating said tape transport to execute said stored tape drive control command upon the completion of said magnetic tape repositioning.

22. In a tape drive, including a tape transport, for reading/writing data records on a magnetic tape, a method of regulating the repositioning of said magnetic tape at the conclusion of a presently executing read/write operation, where said tape transport executes a predefined magnetic tape repositioning step at the conclusion of said presently executing read/write operation to position said magnetic tape such that said tape transport completes its magnetic tape acceleration to perform a subsequent read/write operation at a location on said magnetic tape substantially at the end of said presently read/written data record, comprising the steps of:

storing, in response to the receipt of a tape control command during the execution of said presently executing read/write operation, inclusive of said predefined magnetic tape repositioning step, said received tape drive control command;

determining the stop position of said magnetic tape to execute said received tape drive control command at the completion of said presently executing read/write operation without further magnetic tape repositioning; and transmitting, in response to said determined stop position, reposition control signals to said tape transport to position said magnetic tape at said stop position.

23. The method of claim 22 further including the step of:

activating, in response to said magnetic tape being positioned at said stop position, said tape transport to execute said received tape drive control command.

24. The method of claim 22 wherein said step of determining includes the step of:

storing data indicative of the stop position for a plurality of received tape drive control commands.

25. In a tape drive system for reading/writing data records on a magnetic tape, a method of repositioning a magnetic tape on a tape drive to position said magnetic tape such that said tape transport completes its magnetic tape acceleration to perform a subsequent read/write operation at a location on said magnetic tape substantially at the end of said presently read/written data record, comprising the steps of:

stopping and repositioning said magnetic tape at the end of a data record in response to the conclusion of a presently executing data record read/write operation;

storing a tape drive control command received while said tape drive system is presently reading/writing a data record on said magnetic tape, inclusive of said step of repositioning; and disabling said repositioning step in response to said subsequently received tape drive control command not requiring access to said magnetic tape at the end of said data record.

26. The method of claim 25 further comprising the step of:

determining, in response to said received tape drive control command, a new magnetic tape repositioning location such that no further repositioning is necessary to execute said received tape drive control command at the conclusion of said presently executing read/write operation when said tape is positioned at said new magnetic tape repositioning location.

27. The method of claim 26 further comprising the step of:

translating said new magnetic tape repositioning location into control signals to regulate the operation of said tape transport to locate said magnetic tape at said new magnetic tape repositioning location.

28. The method of claim 27 further comprising the step of:

transmitting said control signals to said tape transport upon the completion of said presently executing data record read/write operation to activate said tape transport to execute said received tape drive control command.

* * * * *